United States Patent
Yun et al.

(10) Patent No.: US 8,581,561 B2
(45) Date of Patent: Nov. 12, 2013

(54) DC-DC BOOST CONVERTER CIRCUIT WITH AN OUTPUT STABILIZATION CIRCUIT AND METHOD FOR DRIVING THE SAME

(75) Inventors: Jae-Jung Yun, Gyeongbuk (KR); Jung-Jae Kim, Gyeonggi-do (KR); Bong-Koo Kang, Gyeongbuk (KR); Young-Ho Hwang, Seoul (KR); Hyung-Jin Choe, Gyeongbuk (KR)

(73) Assignees: LG Display Co., Ltd., Seoul (KR); Postech Academy-Industry Foundation, Gyeongbuk (KR)

( * ) Notice: Subject to any disclaimer, the term of this patent is extended or adjusted under 35 U.S.C. 154(b) by 308 days.

(21) Appl. No.: 12/979,487

(22) Filed: Dec. 28, 2010

(65) Prior Publication Data

US 2011/0309817 A1    Dec. 22, 2011

(30) Foreign Application Priority Data

Jun. 16, 2010    (KR) .................. 10-2010-0056899

(51) Int. Cl.
   *G05F 1/00*    (2006.01)
(52) U.S. Cl.
   USPC .......................................... 323/266; 323/282
(58) Field of Classification Search
   USPC .................. 323/223–24, 234–235, 265–266, 323/271–273, 282–283; 363/59–60
   See application file for complete search history.

(56) References Cited

U.S. PATENT DOCUMENTS

| | | | |
|---|---|---|---|
| 5,067,066 A | * | 11/1991 | Chida .............................. 363/16 |
| 6,060,867 A | * | 5/2000 | Farrington et al. ........... 323/222 |
| 6,434,029 B1 | * | 8/2002 | Cyr et al. ........................ 363/86 |
| 7,332,897 B2 | * | 2/2008 | Lee et al. ....................... 323/222 |
| 2004/0227496 A1 | * | 11/2004 | Hosotani et al. .............. 323/282 |
| 2008/0100273 A1 | * | 5/2008 | Uruno et al. ................... 323/271 |

FOREIGN PATENT DOCUMENTS

| | | |
|---|---|---|
| CN | 101056054 A | 10/2007 |
| KR | 10-2009-0100960 A | 9/2009 |

OTHER PUBLICATIONS

SIPO: Office Action for Chinese Patent Application No. 2010-1059042.0—Issued on Jul. 22, 2013—Including English Translation of Notification of First Office Action and Text of the First Office Action.

* cited by examiner

*Primary Examiner* — Adolf Berhane
*Assistant Examiner* — Jeffrey Gblende
(74) *Attorney, Agent, or Firm* — Morgan, Lewis & Bockius LLP (57) ABSTRACT

Disclosed herein are a DC-DC boost converter circuit, which is capable of preventing power loss and stabilizing switching elements by implementing soft switching and improving efficiency by adding a charge pumping function, and a method for driving the same. The DC-DC boost converter circuit, in which an inductor and an output diode are connected in series and an output capacitor and a load are connected to an output port of the output diode in parallel, includes an output stabilization circuit in which first and second switching elements, a transformer, a plurality of boost capacitors, and a plurality of diodes are connected in series/parallel between the inductor and the output diode.

6 Claims, 7 Drawing Sheets

DC-DC BOOST CONVERTER CIRCUIT WITH AN OUTPUT STABILIZATION CIRCUIT AND METHOD FOR DRIVING THE SAME

This application claims the benefit of Korean Patent Application No. 10-2010-0056899, filed on Jun. 16, 2010, which is hereby incorporated by reference as if fully set forth herein.

BACKGROUND OF THE INVENTION

1. Field of the Invention

The present invention relates to a high-efficiency power circuit, and more particularly, to a DC-DC boost converter circuit, which is capable of preventing power loss and stabilizing switching elements by implementing soft switching and improving efficiency by adding a charge pumping function, and a method for driving the same.

2. Discussion of the Related Art

A general power supply circuit includes a boost converter circuit for outputting a constant voltage by harmonics reduction and power factor improvement and an output voltage control circuit for receiving an output voltage from the boost converter circuit and outputting a desired output voltage.

A DC-DC boost converter circuit includes an inductor, an output diode, a switching element and a capacitor. In detail, the switching element is connected in parallel between the inductor and the output diode, which are connected in series, and the capacitor is connected to an output port of the diode in parallel. Such a DC-DC boost converter circuit detects zero current of the inductor by a variable frequency operation so as to solve reverse recovery characteristics of the output diode, thereby realizing zero-current switching in the switching element and the output diode.

However, in the DC-DC boost converter circuit of the related art, since a voltage having the same level as an output voltage is applied between both ends of the switching element during a turn-off period of the switching element, a switching element having a large withstand voltage should be used if a high output voltage is necessary. In addition, since loss generated in a switching element for performing hard switching at a high speed is proportional to switching frequency, the loss is increased, in turn reducing efficiency of the converter.

If charge pumping is performed, an output voltage is set to an integer multiple of an input voltage according to the number of capacitors. In order to obtain an output voltage which is equal to or greater than twice an input voltage, since a plurality of capacitors and switching elements must be included, the size of the boost circuit is increased, the configuration of the boost circuit becomes complicated, and the input voltage must be increased.

SUMMARY OF THE INVENTION

Accordingly, the present invention is directed to a DC-DC boost converter circuit and a method for driving the same that substantially obviate one or more problems due to limitations and disadvantages of the related art.

An object of the present invention is to provide a DC-DC boost converter circuit, which is capable of preventing power loss and stabilizing switching elements by implementing soft switching and improving efficiency by adding a charge pumping function, and a method for driving the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a DC-DC boost converter circuit, in which an inductor and an output diode are connected in series and an output capacitor and a load are connected to an output port of the output diode in parallel, includes an output stabilization circuit in which first and second switching elements, a transformer, a plurality of boost capacitors, and a plurality of diodes are connected in series/in parallel between the inductor and the output diode.

The output stabilization circuit may include the boost output capacitor connected between the inductor and the output diode in series, the first and second stabilization diodes connected to the boost output capacitor in parallel and connected between the inductor and the output diode in series, the transformer and the first switching element connected to the inductor in parallel and connected to a ground terminal between the inductor and the boost output capacitor, the second switching element connected to the first switching element in parallel and connected between the transformer and the ground terminal, and the stabilization capacitor connected to the first stabilization diode in parallel and connected to the ground terminal between the first and second stabilization diodes.

The output stabilization circuit may include the boost output capacitor connected between the inductor and the output diode in series, the first and second stabilization diodes connected to the boost output capacitor in parallel and connected between the inductor and the output diode in series, the transformer and the first switching element connected to the inductor in parallel and connected to a ground terminal between the inductor and the boost output capacitor, the second switching element connected to the first switching element in parallel and connected between the transformer and the ground terminal, the first stabilization capacitor connected to the transformer in parallel and connected between an input port of the transformer and the ground terminal, and the second stabilization capacitor connected to the first stabilization diode in parallel and connected to the ground terminal between the first and second stabilization diodes.

The first and second switching elements connected to the transformer in parallel may be simultaneously turned on/off, and, when the first and second switching elements are turned on, the same current may flow therein such that current balance of both ends of the first and second switching elements is maintained.

In another aspect of the present invention, a method for driving a DC-DC boost converter circuit, in which an inductor and an output diode are connected in series, an output capacitor and a load are connected to an output port of the output diode in parallel, and an output stabilization circuit, in which first and second switching elements, a transformer, a plurality of boost capacitors, and a plurality of diodes are connected in series/in parallel between the inductor and the output diode, is further included, includes turning the first and second switching elements on, charging the boost output capacitor, continuing to charge the boost output capacitor, and discharging the boost output capacitor.

The method may further include increasing switching current of the first and second switching elements before the boost output capacitor is charged.

The first and second switching elements connected to the transformer in parallel may be simultaneously turned on/off, and, when the first and second switching elements are turned on, the same current may flow therethrough such that current balance of both ends of the first and second switching elements is maintained.

In the DC-DC boost converter circuit and the method for driving the same according to the embodiments of the present invention, it is possible to reduce power loss generated in the switching elements by soft switching so as to improve circuit efficiency, by adding the output stabilization circuit for stabilizing the switching elements while performing the charge pumping function. In addition, it is possible to prevent current from flowing only in one of the switching elements so as to solve current stress and heating.

In addition, since a high output voltage can be generated using a low input voltage and an element having a low withstand voltage can be used when a high output voltage is required, it is possible to reduce switching element costs.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a circuit diagram illustrating a method for driving the DC-DC boost converter in a step of turning first and second switching elements on;

FIG. 8 is a circuit diagram illustrating a DC-DC boost converter operation in a step of turning first and second switching elements on;

DETAILED DESCRIPTION OF THE INVENTION

Hereinafter, a DC-DC boost converter circuit and a method for driving the same according to first and second embodiments of the present invention will be described in detail with reference to the accompanying drawings.

Figure 1:
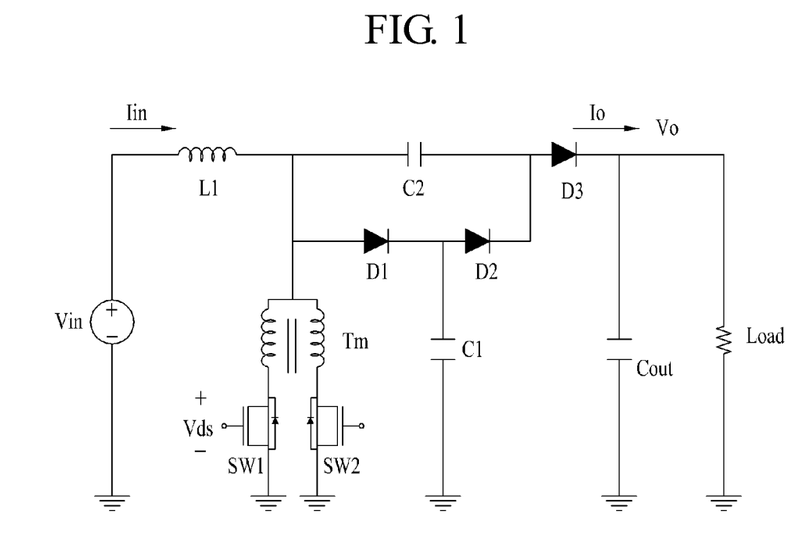
FIG. 1 is a circuit diagram showing a DC-DC boost converter circuit according to a first embodiment of the present invention.

FIG. 1 is a circuit diagram showing a DC-DC boost converter circuit according to a first embodiment of the present invention.

In the DC-DC boost converter circuit shown in FIG. 1, an inductor L1 and an output diode D3 are connected in series, and an output capacitor Cout is connected to an output port of the output diode D3 in parallel. The DC-DC boost converter circuit includes an output stabilization circuit in which first and second switching elements SW1 and SW2, a transformer Tm, a plurality of boost capacitors C1 and C2, and a plurality of diodes D1 and D2 are connected between the input-side inductor L1 and the output-side output diode D3 in series/parallel.

In detail, the DC-DC boost converter circuit is characterized in that the output stabilization circuit is included between the input-side inductor L1 and the output-side output diode D3 in the general DC-DC boost converter circuit including at least one inductor L1, the output diode D3 and the output capacitor Cout. The output stabilization circuit according to the first embodiment of the present invention includes the boost output capacitor C2 connected between the inductor L1 and the output diode D3 in series, the first and second stabilization diodes D1 and D2 which are connected to the boost output capacitor C2 in parallel and are connected between the inductor L1 and the output diode D3 in series, the transformer Tm and the first switching element SW1 which are connected to the inductor L1 in parallel and are connected to a ground terminal in series between the inductor L1 and the boost output capacitor C2, the second switching element SW2 which is connected to the first switching element SW1 in parallel and is connected between the transformer Tm and the ground terminal, and the stabilization capacitor C1 which is connected to the first stabilization diode D1 in parallel and is connected to the ground terminal between the first and second stabilization diodes D1 and D2.

In the output stabilization circuit having the above configuration, when the first and second switching elements SW1 and SW2 connected to the transformer Tm in parallel are turned on, switching current is linearly varied due to the inductance component of the transformer Tm and thus soft switching of the first and second switching elements SW1 and SW2 is implemented. In general, since loss generated in the switching elements SW1 and SW2 is proportional to switching frequency, if soft switching is implemented at a high speed, switching loss is reduced and thus electrical efficiency of the converter circuit can be improved.

The boost output capacitor C2 connected between the inductor L1 and the output diode D3 in series charges or discharges current input thereto so as to perform a charge pumping function. In detail, a period during which current is charged in the boost output capacitor C2 is a turn-on period of the first and second switching elements SW1 and SW2. At this time, since current flows in the stabilization capacitor C1, the second stabilization diode D2, the transformer Tm, and the first and second switching elements SW1 and SW2, the boost output capacitor C2 charges current input thereto. In periods when the first and second switching elements SW1 and SW2 are turned off, current is discharged and is output to an output port through the output diode D3.

The stabilization capacitor C1 is charged through the first stabilization diode D1 in the turn-off period of the first and second switching elements SW1 and SW2, and is discharged in the turn-on period of the first and second switching elements SW1 and SW2 so as to charge the boost output capacitor C2.

The first and second switching elements SW1 and SW2 connected to the transformer Tm in parallel are simultaneously turned on or off. When the first and second switching elements are turned on, the same current flows therein. Thus, current balance of both ends of the first and second switching elements SW1 and SW2 is maintained and soft switching is possible. In detail, since the first and second switching elements SW1 and SW2 are connected to the 1:1 transformer Tm including a plurality of inductors in parallel, currents of the same level are supplied to the first and second switching elements. Accordingly, current does not flow only in one switching element, and the current balance of both ends of the first and second switching elements SW1 and SW2 is maintained. Thus, it is possible to prevent a heating phenomenon due to current stress and to implement soft switching.

As described above, the method for driving the DC-DC boost converter according to the first embodiment of the present invention includes a step of turning the first and second switching elements SW1 and SW2 on, a step of charging the boost output capacitor C2, a step of continuing to charge the boost output capacitor C2 and a step of discharging the boost output capacitor C2. Hereinafter, the method for driving the DC-DC boost converter according to the first embodiment of the present invention will be described stepwise with reference to the accompanying drawings.

Figure 2:
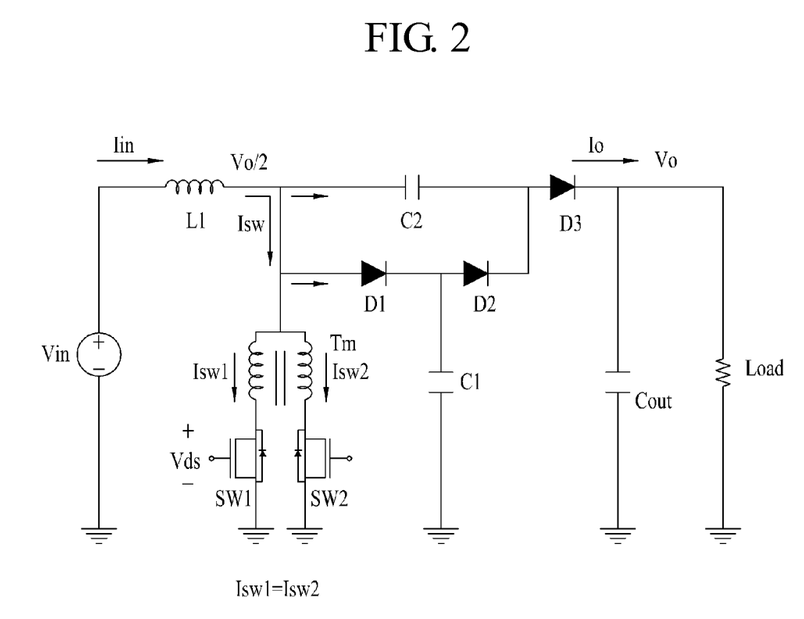
Figure 3:
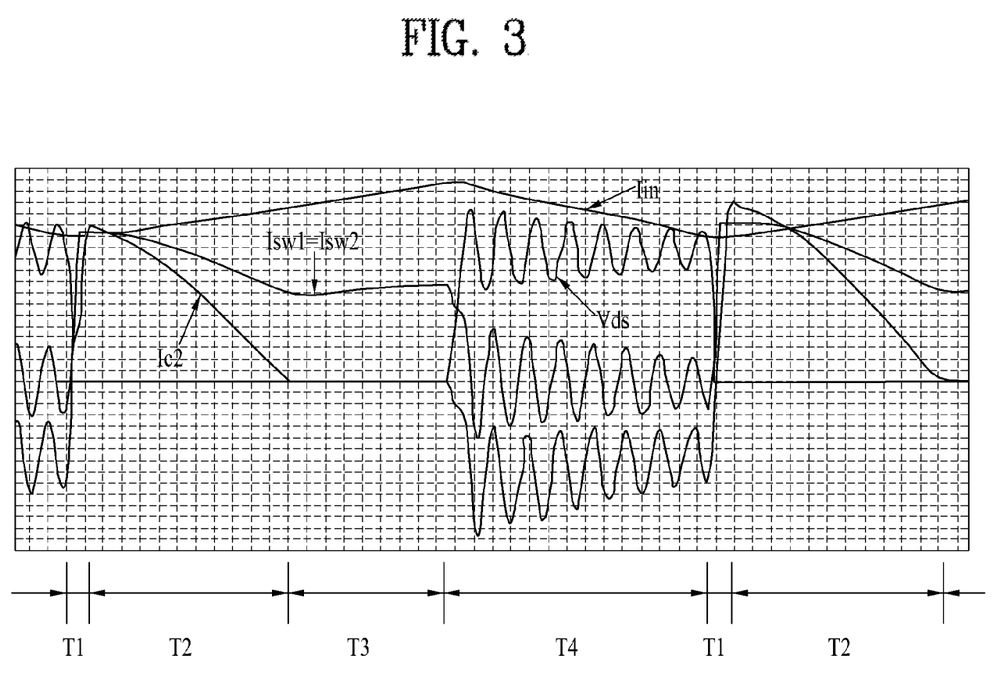
FIG. 3 is a waveform diagram showing current waveforms of steps of driving the DC-DC boost converter.
Figure 4:
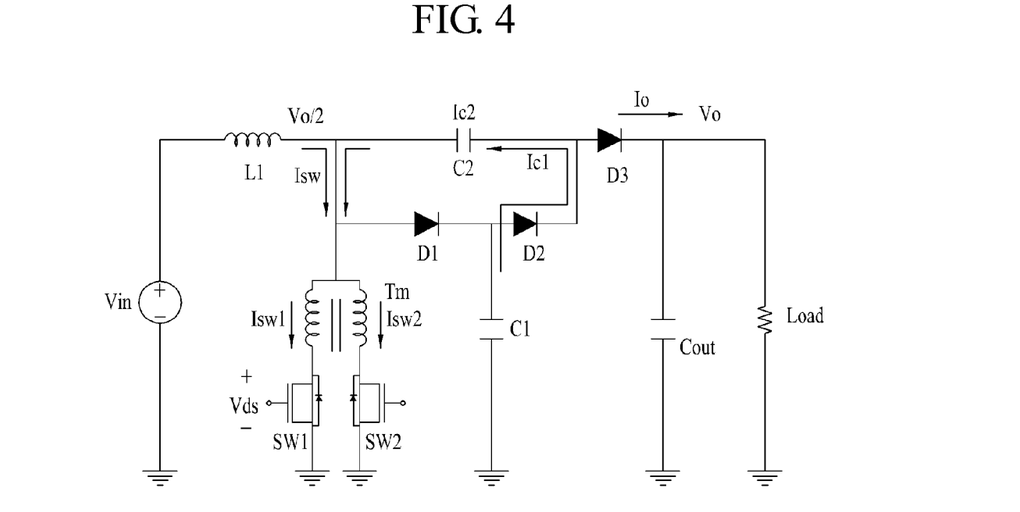
FIG. 4 is a circuit diagram illustrating a DC-DC boost converter operation in a step of charging a boost output capacitor.
Figure 5:
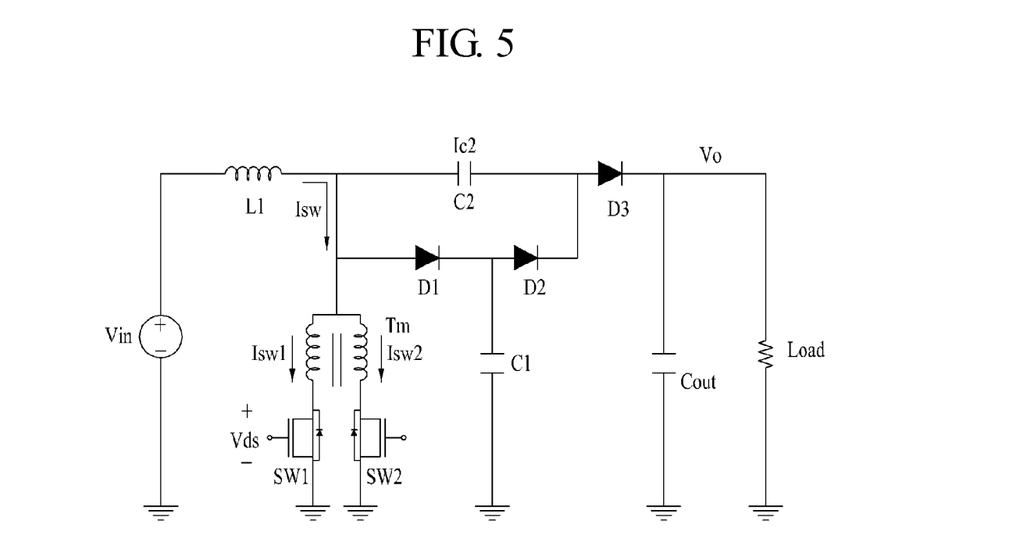
FIG. 5 is a circuit diagram illustrating a DC-DC boost converter operation in a step of continuing to charge the boost output capacitor.
Figure 6:
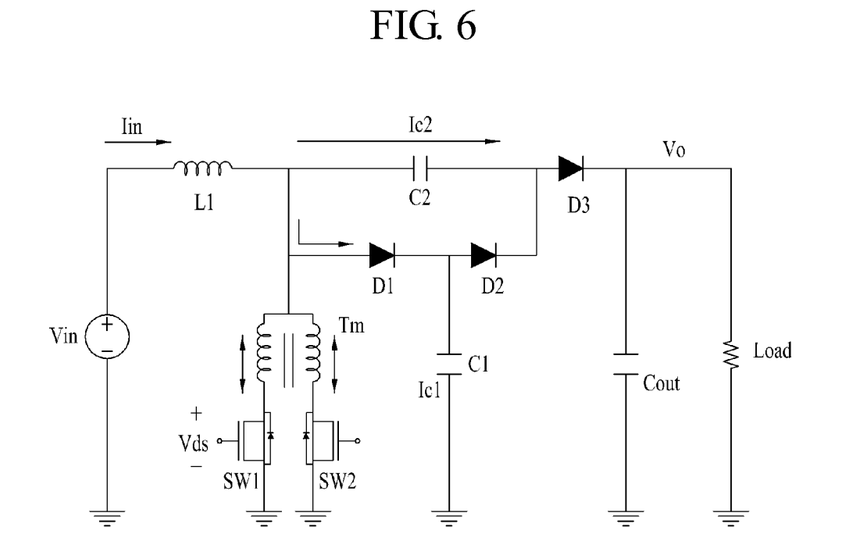
FIG. 6 is a circuit diagram illustrating a DC-DC boost converter operation in a step of discharging the boost output capacitor.

FIG. 2 is a circuit diagram illustrating the method for driving the DC-DC boost converter in the step of turning the first and second switching elements on, FIG. 3 is a waveform diagram showing current waveforms of steps of driving the DC-DC boost converter, FIG. 4 is a circuit diagram illustrating a DC-DC boost converter operation in the step of charging the boost output capacitor, FIG. 5 is a circuit diagram illustrating a DC-DC boost converter operation in the step of continuing to charge the boost output capacitor, and FIG. 6 is a circuit diagram illustrating a DC-DC boost converter operation in the step of discharging the boost output capacitor.

First, referring to FIG. 2, the step T1 of turning the first and second switching elements SW1 and SW2 on corresponds to a period T1 during which the first and second switching elements SW1 and SW2 are switched from off to on, that is, a period T1 from the instant that the first and second switching elements SW1 and SW2 are turned on to a time when switching current Isw flowing in the transformer Tm becomes equal to input current Iin. At this time, the divided voltage of an output voltage V0, that is, a voltage of Vo/2, is applied to an input port of the transformer Tm, and, as shown in FIG. 3, the switching current Isw flowing through the transformer Tm and the first and second switching elements SW1 and SW2 is linearly increased so as to become equal to the input current Iin (T1). At this time, current does not flow in the first stabilization diode D1 and the output diode D3 and current flows in the second stabilization diode D2.

Referring to FIG. 4, the step T2 of charging the boost output capacitor C2 corresponds to a period T2 after the switching current Isw flowing through the first and second switching elements SW1 and SW2 becomes equal to the input current Iin. At this time, the switching current Isw flowing through the first and second switching elements SW1 and SW2 is increased as shown in FIG. 3, by adding resonance current from the stabilization capacitor C1 and the boost output capacitor C2 to the input current Iin. In this case, the switching current Isw is equally divided into first switching current Isw1 and second switching current Isw2 by the 1:1 transformer Tm. The voltage of the input port of the transformer Tm begins to be decreased from the divided voltage of the output voltage V0, that is, the voltage of Vo/2, to 0V, and the boost output capacitor C2 is charged by the resonance current. At this time, the second stabilization diode D2 is short-circuited and the first stabilization diode D1 and the output diode D3 are open-circuited.

Next, in the step T3 of continuing to charge the boost output capacitor C2 shown in FIG. 5, if the charging of the boost output capacitor C2 is completed, the resonance current does not flow in the stabilization capacitor C1, the boost output capacitor C2 and the transformer Tm. Accordingly, the switching current Isw flowing through the first and second switching elements SW1 and SW2 becomes equal to the input current Iin as shown in FIG. 3. At this time, all the first and second stabilization diodes D1 and D2 and the output diode D3 are open-circuited.

Finally, the step T4 of discharging the boost output capacitor C2 shown in FIG. 6 corresponds to the period during which the first and second switching elements SW1 and SW2 are turned off. At this time, the voltage of the input port of the transformer Tm begins to be increased from 0V to the divided voltage of the output voltage V0, that is, the voltage of Vo/2. Accordingly, the capacitor component of the first and second switching elements SW1 and SW2 and the resonance current of the transformer Tm and the boost output capacitor C2 are added to the input current Iin and the boosted current is supplied to a load as shown in FIG. 3. At this time, the stabilization capacitor C1 charges the current input through the first stabilization diode D1.

Thereafter, the step T1 of turning the first and second switching elements SW1 and SW2 on to the step T4 of discharging the boost output capacitor C2 are repeated. In the DC-DC boost converter according to the first embodiment of the present invention, it is possible to generate a high output voltage using a low input voltage by adding the output stabilization circuit for performing the charge pumping function to the general boost converter circuit. In addition, since an element having a low withstand voltage can be used when a high output voltage is required, it is possible to reduce switching element costs. In addition, since soft switching is possible, it is possible to reduce power loss generated in the switching elements SW1 and SW2 so as to improve circuit efficiency, and to prevent current from flowing only in one of the switching elements SW1 and SW2 so as to solve current stress and heating.

Figure 7:
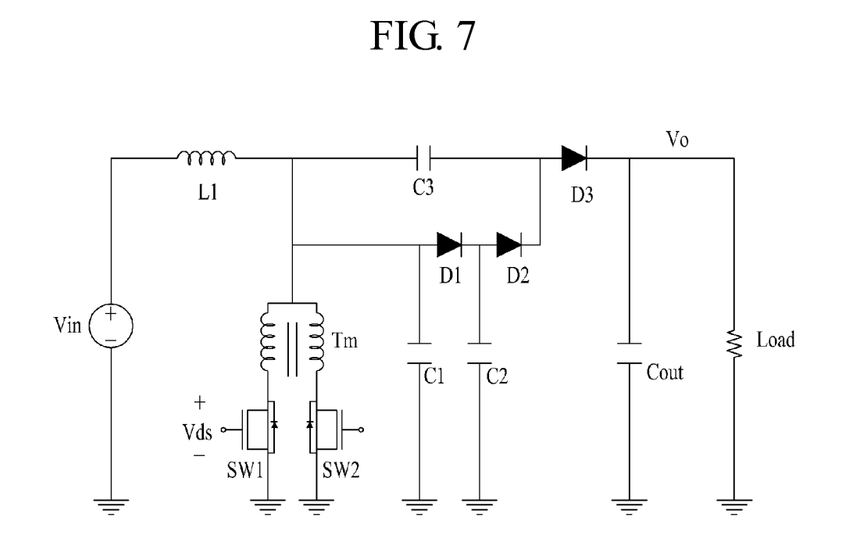
FIG. 7 is a circuit diagram showing a DC-DC boost converter circuit according to a second embodiment of the present invention.

FIG. 7 is a circuit diagram showing a DC-DC boost converter circuit according to a second embodiment of the present invention.

In the DC-DC boost converter circuit shown in FIG. 7, an inductor L1 and an output diode D3 are connected in series, and an output capacitor Cout is connected to an output port of the output diode D3 in parallel. The DC-DC boost converter circuit includes an output stabilization circuit in which first and second switching elements SW1 and SW2, a transformer Tm, a plurality of boost capacitors C1 and C2, and a plurality of diodes D1 and D2 are connected between the input-side inductor L1 and the output-side output diode D3 in series/in parallel.

The output stabilization circuit according to the second embodiment of the present invention includes the boost output capacitor C3 connected between the inductor L1 and the output diode D3 in series, the first and second stabilization diodes D1 and D2 which are connected to the boost output capacitor C3 in parallel and are connected between the inductor L1 and the output diode D3 in series, the transformer Tm and the first switching element SW1 which are connected to the inductor L1 in parallel and are connected to a ground terminal in series between the inductor L1 and the boost output capacitor C3, the second switching element SW2 which is connected to the first switching element SW1 in parallel and is connected between the transformer Tm and the ground terminal, the first stabilization capacitor C1 which is connected to the transformer Tm in parallel and is connected between an input port of the transformer Tm and the ground terminal, and the second stabilization capacitor C2 which is connected to the first stabilization diode D1 in parallel and is connected to the ground terminal between the first and second stabilization diodes D1 and D2.

In the output stabilization circuit having the above configuration, when the first and second switching elements SW1 and SW2 connected to the transformer Tm in parallel are turned on, switching current is linearly varied due to the inductance component of the transformer Tm and thus soft switching of the first and second switching elements SW1 and SW2 is implemented. In addition, the boost output capacitor C3 connected between the inductor L1 and the output diode D3 in series charges or discharges current input thereto so as to perform a charge pumping function.

The first and second switching elements SW1 and SW2 connected to the transformer Tm in parallel are simultaneously turned on or off. When the first and second switching elements are turned on, the same current flows therein. Thus, current balance of both ends of the first and second switching elements SW1 and SW2 is maintained and soft switching is possible.

The DC-DC boost converter according to the second embodiment of the present invention having the above configuration is operated by a step of turning the first and second switching elements SW1 and SW2 on, a step of increasing switching current Isw of the first and second switching elements SW1 and SW2, a step of charging the boost output capacitor C3, a step of continuing to charge the boost output capacitor C3 and a step of discharging the boost output capacitor C3. Hereinafter, the method for driving the DC-DC boost converter according to the second embodiment of the present invention will be described stepwise with reference to the accompanying drawings.

Figure 8:
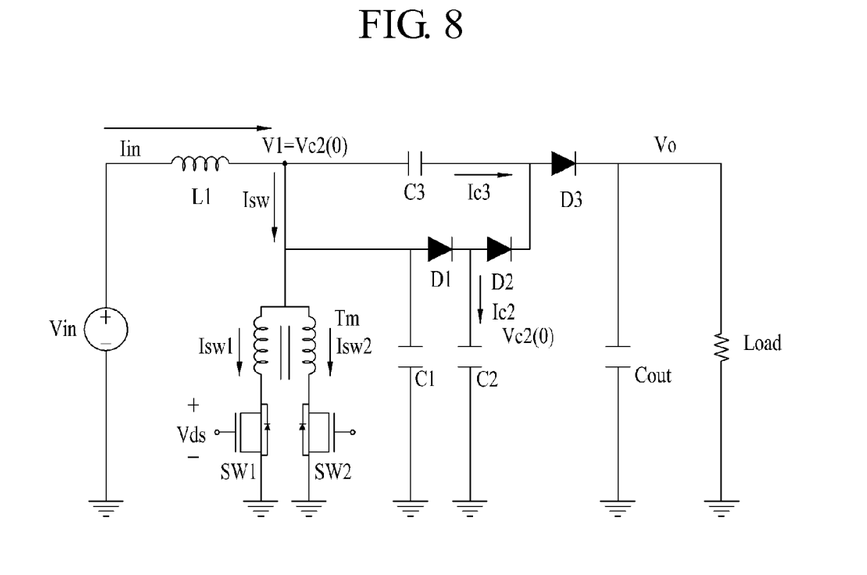
Figure 9:
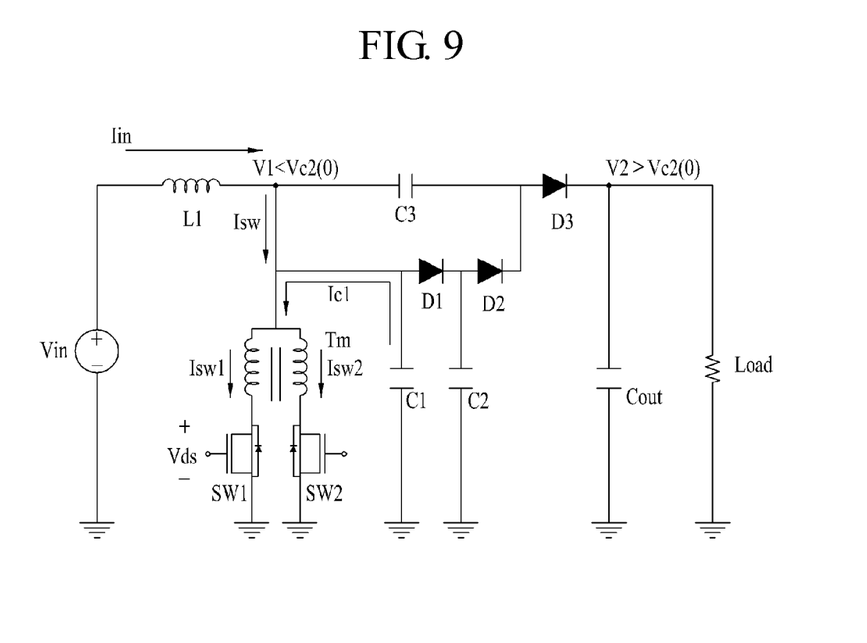
FIG. 9 is a circuit diagram illustrating a DC-DC boost converter operation in a step of increasing switching current of the first and second switching elements.
Figure 10:
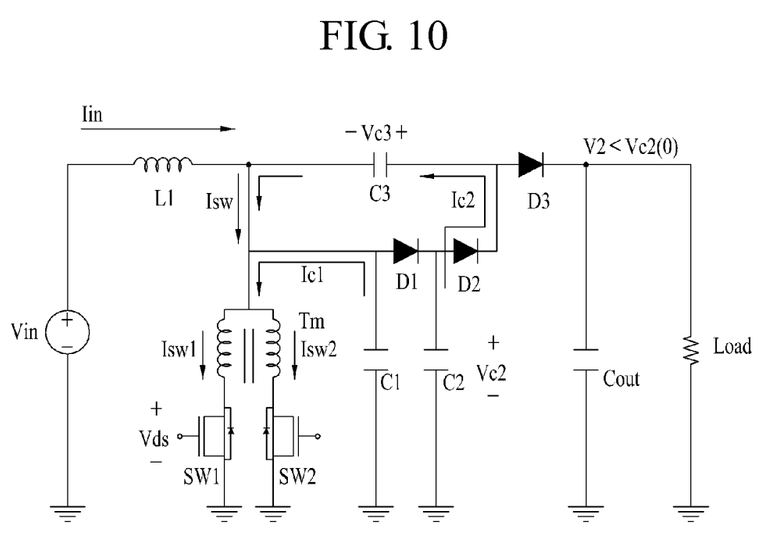
FIG. 10 is a circuit diagram illustrating a DC-DC boost converter operation in a step of charging a boost output capacitor.
Figure 11:
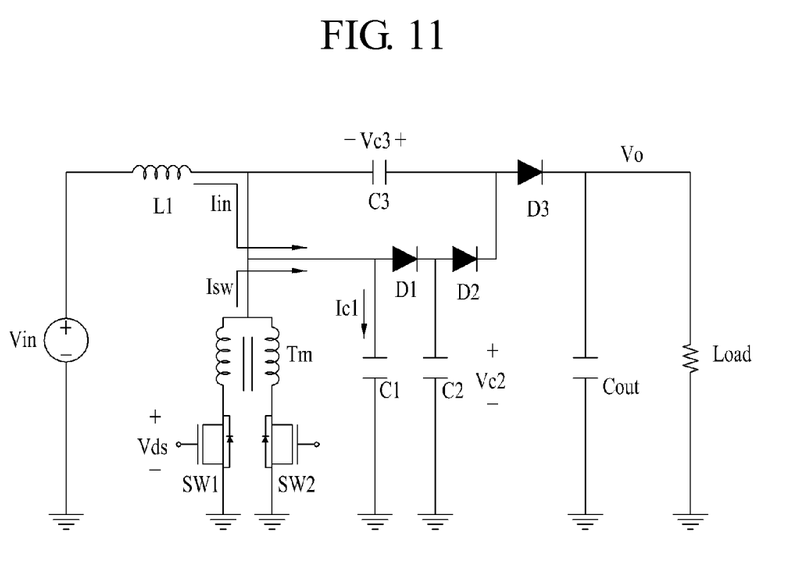
FIG. 11 is a circuit diagram illustrating a DC-DC boost converter operation in a step of continuing to charge the boost output capacitor.
Figure 12:
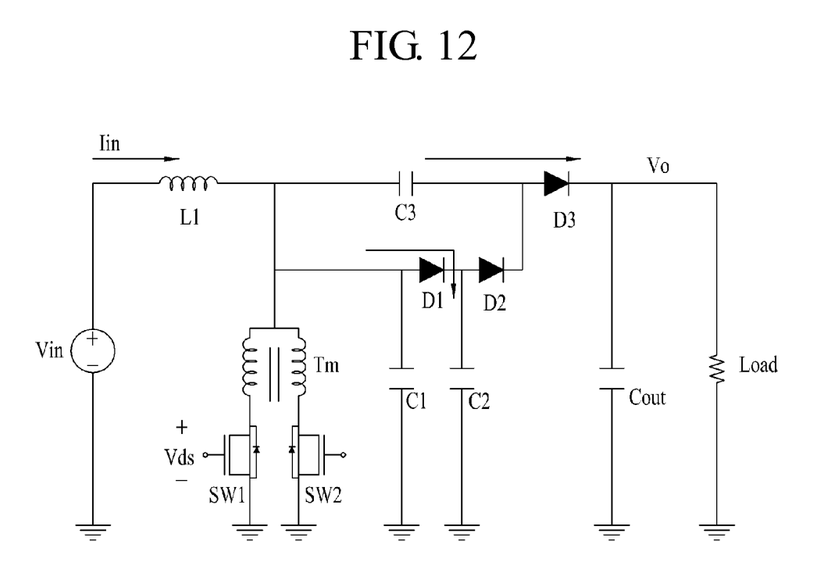
FIG. 12 is a circuit diagram illustrating a DC-DC boost converter operation in a step of discharging the boost output capacitor.

FIG. 8 is a circuit diagram illustrating a DC-DC boost converter operation in a step of turning first and second switching elements on, FIG. 9 is a circuit diagram illustrating a DC-DC boost converter operation in a step of increasing switching current of the first and second switching elements, FIG. 10 is a circuit diagram illustrating a DC-DC boost converter operation in a step of charging a boost output capacitor, FIG. 11 is a circuit diagram illustrating a DC-DC boost converter operation in a step of continuing to charge the boost output capacitor, and FIG. 12 is a circuit diagram illustrating a DC-DC boost converter operation in a step of discharging the boost output capacitor.

First, referring to FIG. 8, the step of turning the first and second switching elements SW1 and SW2 on corresponds to a period T1 during which the first and second switching elements SW1 and SW2 are switched from off to on, that is, a period T1 from the instant that the first and second switching elements SW1 and SW2 are turned on to a time when switching current Isw flowing in the transformer Tm becomes equal to input current Iin.

In detail, when the first and second switching elements SW1 and SW2 begin to be turned on, the switching current Isw is linearly increased due to the inductance component of the transformer Tm, and the currents Ic3 and Ic2 flowing in the boost output capacitor C3 and the second stabilization capacitor C2 are decreased. At this time, the voltage of an input port of the transformer Tm is held at a positive voltage (Vc2(0)=constant voltage) for a predetermined period, the output diode D3 and the first stabilization diode D1 are open-circuited and the second stabilization diode D2 is short-circuited.

Next, referring to FIG. 9, in the step of increasing the switching current Isw of the first and second switching elements SW1 and SW2, the first stabilization capacitor C1 and the transformer Tm behave such that resonance current flows at the instant that the switching current Isw becomes equal to the input current Iin, thereby increasing the switching current Isw. Here, since the switching current Isw1 of the first switching element SW1 and the switching current Isw2 of the second switching element SW2 are equal and current flows from the first stabilization capacitor C1 to the transformer Tm by LC resonance, the voltage of the first stabilization capacitor C1 is decreased and becomes negative. At this time, the first and second stabilization diodes D1 and D2 and the output diode D3 are open-circuited.

Thereafter, referring to FIG. 10, in the step of charging the boost output capacitor C3, if the input voltage is reduced such that the voltage V2 of the output port is less than the voltage Vc2 of the second stabilization capacitor C2, the second stabilization diode D2 is open-circuited and current flows from the second stabilization capacitor C2 to the transformer Tm through the boost output capacitor C3. Then, the boost output capacitor C3 is charged and the current Ic1 from the first stabilization capacitor C1 is gradually decreased.

As shown in FIG. 11, in the step of continuing to charge the boost output capacitor C3, the first and second switching elements SW1 and SW2 begin to be turned off and the input current Iin and the switching current Isw in the first stabilization capacitor C1 are charged. At this time, the first and second stabilization diodes D1 and D2 and the output diode D3 are all short-circuited.

Finally, referring to FIG. 12, the step of discharging the boost output capacitor C3 corresponds to a period during which the first and second switching elements SW1 and SW2 are turned off. At this time, the capacitor component of the first and second switching elements SW1 and SW2 and the resonance current of the transformer Tm and the boost output capacitor C3 are added to the input current Iin and the boosted current is supplied to a load. At this time, the second stabilization capacitor C2 charges the current Iin input through the first stabilization diode D1.

Thereafter, the step of turning the first and second switching elements SW1 and SW2 on to the step of discharging the boost output capacitor C2 are sequentially repeated.

As described above, in the DC-DC boost converter according to the embodiment of the present invention, it is possible to generate a high output voltage using a low input voltage by adding the output stabilization circuit for performing the charge pumping function to the general boost converter circuit. In addition, since an element having a low withstand voltage can be used when a high output voltage is required, it is possible to reduce switching element costs.

In addition, since soft switching is possible, it is possible to reduce power loss generated in the switching elements SW1 and SW2 so as to improve circuit efficiency, and to prevent current from flowing only in one of the switching elements SW1 and SW2 so as to solve current stress and heating.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A DC-DC boost converter circuit in which an inductor and an output diode are connected in series and an output capacitor and a load are connected to an output port of the output diode in parallel, the DC-DC boost converter circuit comprising:
an output stabilization circuit in which first and second switching elements, a transformer, a plurality of boost capacitors, and first and second stabilization diodes are connected in parallel between the inductor and the output diode,
wherein the output stabilization circuit includes:
the plurality of boost capacitors connected between the inductor and the output diode in series,
the first and second stabilization diodes connected to the boost capacitor in parallel and connected between the inductor and the output diode in series,
the transformer and the first switching element connected to the inductor in parallel and connected to a ground terminal between the inductor and the boost capacitor,
the second switching element connected to the first switching element in parallel and connected between the transformer and the ground terminal, and
a stabilization capacitor connected to the first stabilization diode in parallel and connected to the ground terminal between the first and second stabilization diodes.

2. A DC-DC boost converter circuit in which an inductor and an output diode are connected in series and an output capacitor and a load are connected to an output port of the output diode in parallel, the DC-DC boost converter circuit comprising:
an output stabilization circuit in which first and second switching elements, a transformer, a plurality of boost capacitors, and first and second stabilization diodes are connected in parallel between the inductor and the output diode,
wherein the output stabilization circuit includes:
the plurality of boost capacitors connected between the inductor and the output diode in series;
the first and second stabilization diodes connected to the boost capacitor in parallel and connected between the inductor and the output diode in series;
the transformer and the first switching element connected to the inductor in parallel and connected to a ground terminal between the inductor and the boost output capacitor;
the second switching element connected to the first switching element in parallel and connected between the transformer and the ground terminal;
a first stabilization capacitor connected to the transformer in parallel and connected between an input port of the transformer and the ground terminal; and
a second stabilization capacitor connected to the first stabilization diode in parallel and connected to the ground terminal between the first and second stabilization diodes.

3. The DC-DC boost converter circuit according to claim 1, wherein the first and second switching elements connected to the transformer in parallel are simultaneously turned on/off, and, when the first and second switching elements are turned on, the same current flows therethrough such that current balance of both ends of the first and second switching elements is maintained.

4. A method for driving a DC-DC boost converter circuit with an output stabilization circuit in which an inductor and an output diode are connected in series, an output capacitor and a load are connected to an output port of the output diode in parallel, and the output stabilization circuit, in which first and second switching elements, a transformer, a plurality of boost capacitors, and first and second stabilization diodes are connected in parallel between the inductor and the output diode, is further included, the method comprising:
turning the first and second switching elements on;
charging the boost output capacitor;
continuing to charge the boost output capacitor; and
discharging the boost output capacitor,
wherein the output stabilization circuit includes:
the plurality of boost capacitors connected between the inductor and the output diode in series,
the first and second stabilization diodes connected to the boost output capacitor in parallel and connected between the inductor and the output diode in series,
the transformer and the first switching element connected to the inductor in parallel and connected to a ground terminal between the inductor and the boost output capacitor,
the second switching element connected to the first switching element in parallel and connected between the transformer and the ground terminal, and
a stabilization capacitor connected to the first stabilization diode in parallel and connected to the ground terminal between the first and second stabilization diodes.

5. The method according to claim 4, further comprising increasing switching current of the first and second switching elements before the boost output capacitor is charged.

6. The method according to claim 5, wherein the first and second switching elements connected to the transformer in parallel are simultaneously turned on/off, and, when the first and second switching elements are turned on, the same current flows therethrough such that current balance of both ends of the first and second switching elements is maintained.

* * * * *